United States Patent

Jensen et al.

[15] 3,658,088

[45] Apr. 25, 1972

[54] PACKAGING SYSTEM FOR PNEUMATIC LOGIC

[72] Inventors: Donald F. Jensen, Endicott; David H. Rickenbach, Chenango Forks; Robert R. Schaffer, Endwell, all of N.Y.

[73] Assignee: International Business Machines Corporation, Armonk, N.Y.

[22] Filed: June 17, 1970

[21] Appl. No.: 46,854

[52] U.S. Cl. .............................. 137/561, 137/81.5, 137/608
[51] Int. Cl. .............................. F15c 5/00
[58] Field of Search .............................. 137/81.5, 608, 343, 561; 235/201; 285/189, 196, 162

[56] References Cited

UNITED STATES PATENTS

| | | | |
|---|---|---|---|
| 3,465,774 | 9/1969 | Kautz et al. | 137/81.5 |
| 3,495,608 | 2/1970 | O'Keefe | 137/81.5 |
| 3,547,139 | 12/1970 | Van Berkum | 137/81.5 |
| 3,548,849 | 12/1970 | Purcell et al. | 137/81.5 |
| 3,272,542 | 9/1966 | Haulik et al. | 285/189 |
| 3,434,746 | 3/1969 | Watts | 285/162 |

OTHER PUBLICATIONS

Langley, R. F. and Schulz, P. B. " Modular Pneumatic Logic Package," I.B.M. Tech. Dis. Bulletin, Vol. 6, No. 5, October 1963.

*Primary Examiner*—William R. Cline
*Attorney*—Sughrue, Rothwell, Mion, Zinn & Macpeak

[57] ABSTRACT

The basic device for connecting fluid logic circuits comprises a base plate, a sealing film, a back seal plate, a circuit plate, a front seal plate and a gasket adapted to have a plurality of logic modules mounted thereon. The front seal plate is perforated to provide for connection of every possible logic input and output to the circuit plate which is provided with perforations and interconnecting channels for the required hole-to-hole connections. The back seal plate seals the channels and is perforated to allow communication with input and output lines. The seal film is perforated only at selected locations and the base plate is completely perforated with holes adapted to accept terminals for the input and output tubing connections.

6 Claims, 9 Drawing Figures

INVENTORS
D. F. JENSEN
D.H. RICKENBACH
R. R. SCHAFFER

PACKAGING SYSTEM FOR PNEUMATIC LOGIC

BACKGROUND OF THE INVENTION

1. Field of the Invention

The present invention is directed broadly to the packaging of complex fluidic circuits. More specifically, the present invention provides a packaging system which provides for pluggable fluid circuit modules by using permanent fluid circuitry which may readily be modified to provide for engineering changes. Although the present system was developed specifically for diaphragm pneumatic logic, it may be used with any pneumatic technology including those with and without moving parts.

2. Prior Art

The prior art devices ranged from standard fluid circuits with back-panel interconnecting conduits to fully integrated fluid circuits with only the input and output lines exposed. The back-panel conduit approach allows for maximum changeability and accessibility. The need for manual connections, however, makes this method uneconomical for complex, high volume applications. On the other hand, large scale integrated packaging, while probably the most economical in initial cost has accessibility problems, primarily with respect to engineering changes in the field.

SUMMARY OF THE INVENTION

The present invention comprises a multi-ply laminated circuit board adapted to have a plurality of circuit modules mounted thereon and including a circuit plate having a plurality of interconnection channels formed therein. Suitable means are provided for adding or eliminating external input or output connections and for adding or eliminating interconnections between the holes in the assembly.

It is the principal object of the present invention to provide a packaging system which readily provides for changes in the sub-surface "permanent" fluid connections from the back panel while eliminating a significant amount of exposed back panel conduits.

It is a further object of the present invention to provide a hybrid system utilizing integrated or "permanent" fluid circuits in combination with back panel conduits to provide the maximum flexibility at the lowest cost.

These and other objects, features and advantages of the present invention will be more clearly understood through a consideration of the following detailed description. In the course of the description reference will be made to the attached drawings.

DETAILED DESCRIPTION OF THE INVENTION

Figure 1:
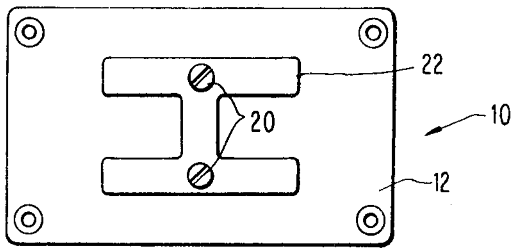
FIG. 1 is a top plan view of a circuit module.
Figure 2:
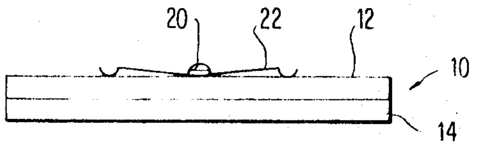
FIG. 2 is a side elevational view of the circuit module shown in FIG. 1.

A typical fluidic module is shown in FIGS. 1 and 2 and is comprised of two halves 12 and 14, each independently sealed by a diaphragm (not shown) and then riveted together. The input and output holes for the module are all located on the underside of the module as viewed in FIG. 1 and are connected to the circuit board 16 through a closed cell neoprene foam gasket 18. Two screws 20 at the center of the module hold a spring-clamp 22 which exerts a uniform load at four points on the module sealing it through the gasket 18 against the circuit board 16. The standard fluidic logic arrangement consists of 12 of these circuit modules mounted adjacent each other on the circuit board 16.

Figure 3:
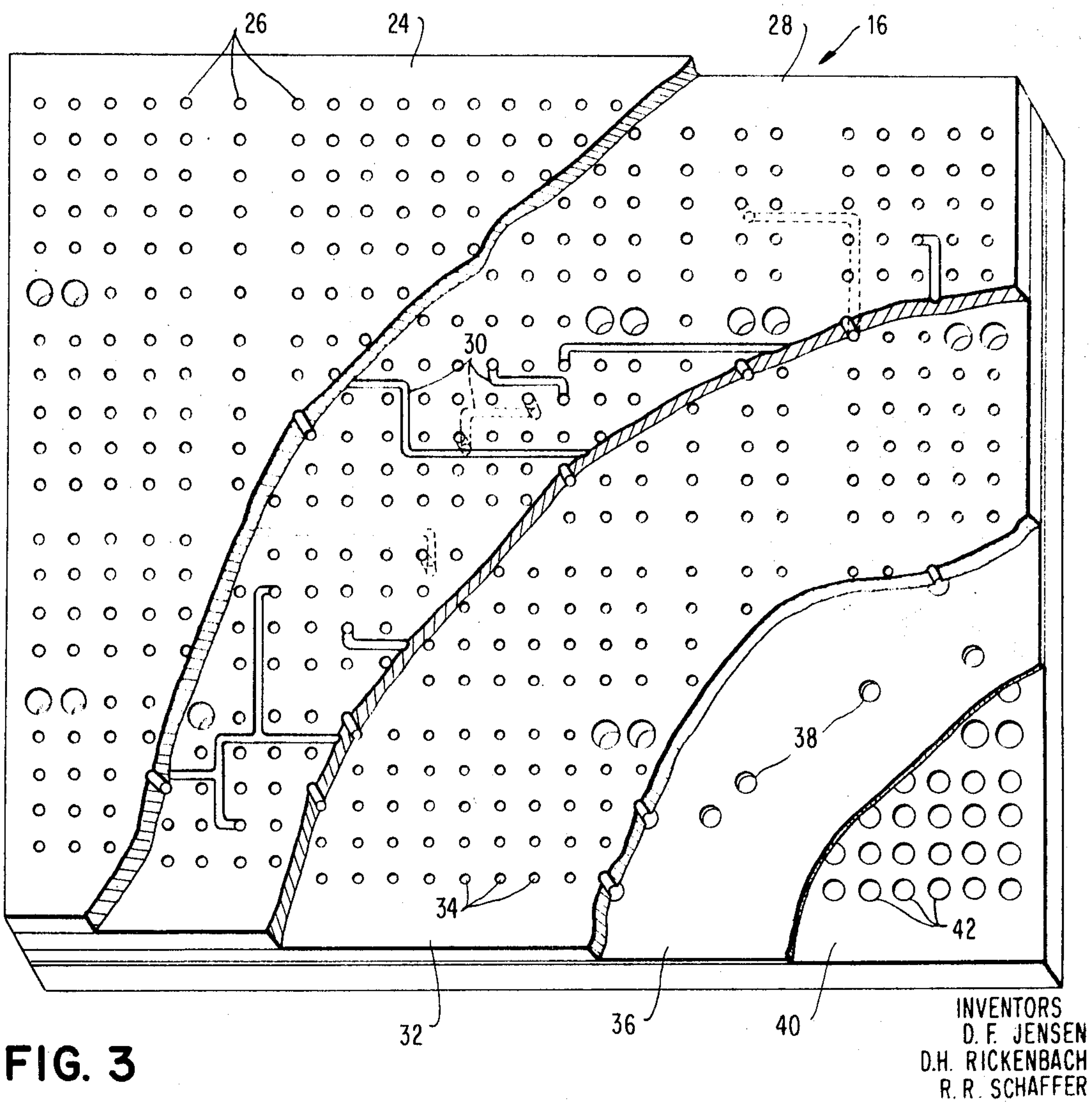
FIG. 3 is a perspective view of the 5 plys of the laminated board in assembled condition with portions of 4 of the plys being broken away.

The circuit board itself consists of a sandwich or laminate of five layers as shown in FIG. 3. The front seal plate 24 has a plurality of perforations such as those shown in 26 to provide for the connection of every possible logic input and output to the printed circuit plate 28 while sealing the circuit plate between the holes. The printed circuit plate 28 contains channels such as those shown at 30 to provide the required hole to hole connections. These channels 30 may be located on both sides of the circuit plate 28 to allow for crossovers. A back seal plate 32 seals the channel 30 on the back side of the circuit plate 28 and is provided with a plurality of perforations such as those shown at 34 to allow communication with input and output lines. A seal film 36 is located adjacent to the back seal plate 32 and is provided with perforations such as those shown at 38 only at selected locations. These are the locations where inputs and outputs to the circuit board must be connected. The base plate 40 provides the structural rigidity for the sandwich or laminate and contains the power distribution channels for the circuit modules. The base plate is completely perforated with holes such as those shown at 42 which are adapted to accept terminals for the input and output tubing connections.

Figure 4:
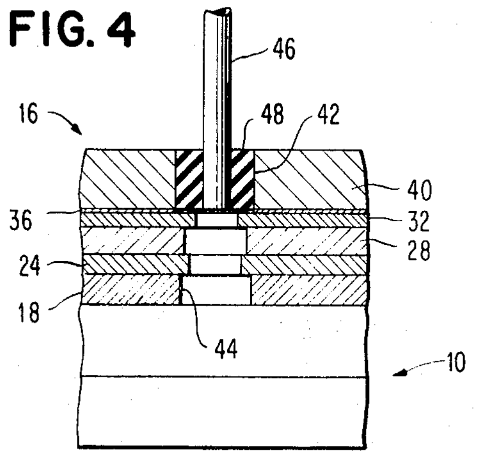
FIG. 4 is a partial cross section through the board showing a normal external connection.

The gasket 18 which is disposed over the front surface of the front sealing plate 24 is provided with holes such as the hole 44 shown in FIG. 4 which correspond in each case to a hole 26 in the front sealing plate 24.

The pneumatic logic circuit board described above has been designed to allow for field changes. The changes provided for include elimination of an output connection, addition of an output connection, elimination of an interconnection and an addition of an interconnection.

Figure 5:
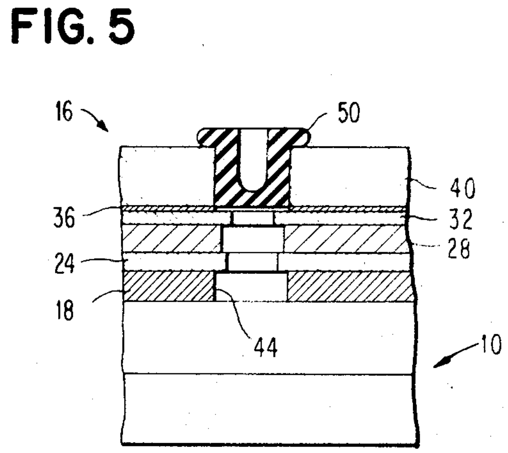
FIG. 5 is a view similar to FIG. 4 showing the manner in which an external connection may be eliminated.

The elimination of an external connection is illustrated in FIG. 4. This figure shows a normal external connecting terminal which consists of a rigid tube 46, such as stainless steel with a resilient sleeve 48 such as rubber molded thereon and plugged into a hole 42 in the base plate 40. Connections are made by forcing plastic tubing over the outside of the rigid tube 46 and the terminal is held in the hole in the base plate without the possibility of air leakage by means of an interference fit between the resilient sleeve of the terminal and the hole. The seal film 36 is perforated at this location to provide for fluid communication therethrough. The external connection shown in FIG. 4 may be eliminated simply by removing the tube 46 and sleeve 48 and substituting a terminal plug 50 as shown in FIG. 5. The terminal 50 is formed from resilient material and may be provided with a solid pin molded therein to assist in the insertion and removal of the terminal.

Figure 6:
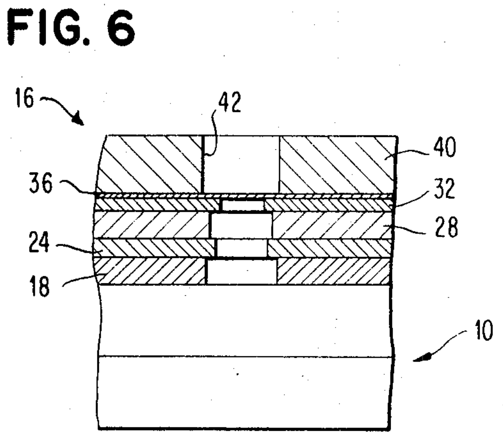
FIG. 6 is a view similar to FIG. 4 showing a hole location in the board which was not originally equipped to be an external connection.
Figure 7:
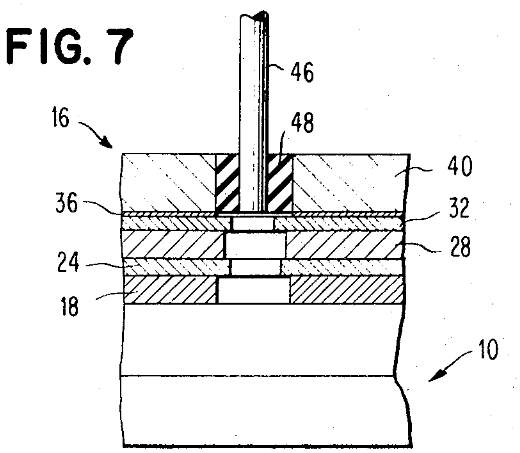
FIG. 7 is a view similar to FIG. 6 showing the same location modified to provide an external connection.

FIG. 6 illustrates the addition of an external connection at a location not originally designed to receive one. This is due to the fact that the seal film 36 is not perforated in alignment with the hole 42. To add an external connection the seal film 36 must be broken. Since the seal film 36 is usually a plastic or organic film of polyurethane or other similar material it can be perforated without residue simply by touching it with a hot soldering tip. After perforation of the seal film 36, as shown in FIG. 7, an output terminal having a tube 46 and resilient sleeve 48 can be added to complete the change.

Figure 8:
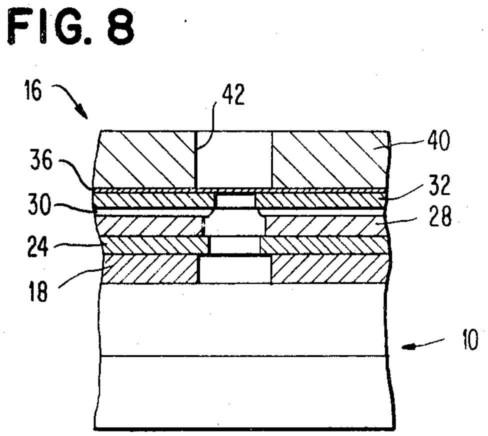
FIG. 8 is a view similar to FIG. 6 showing the normal arrangement for hole interconnection within the board.
Figure 9:
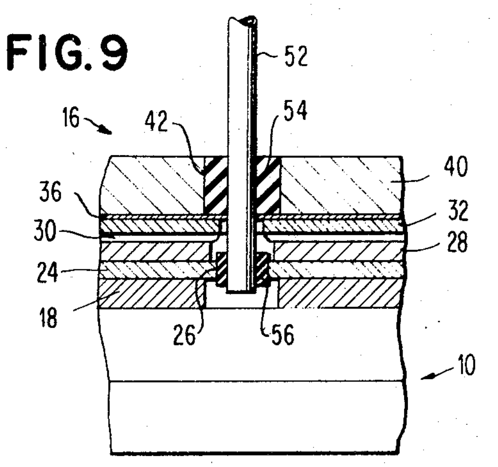
FIG. 9 is a view similar to FIG. 8 showing the elimination of the interconnection.

A double sealing terminal is also provided for use in eliminating an interconnection such as the interconnection 30 which extends between two holes 31, one of which is shown in FIG. 8, in the circuit plate 28. At such a hole location, the seal film 36 may extend across the opening, as shown in FIG. 8, or may be perforated at this location if an external connection is also made at this location. If the seal film 36 is not perforated at the location where the interconnection is to be eliminated, the film is first perforated in the manner described above with respect to FIGS. 6 and 7. If no external connection is desired at the location a solid pin 52 having a first resilient seal sleeve 54 and a second resilient seal sleeve 56 molded thereon is inserted into the opening such that the sleeve 54 will seal the opening 42 in plate 40 and the sleeve 56 will seal the opening 26 in seal plate 24. Thus, the two seals, one on each side of the circuit plate 28, eliminate the previous interconnection. If an external connection is desired at the location, the terminal may be a hollow rigid conduit or tube (not shown) similar to the tube 46 but with resilient sleeves similar to sleeves 54 and 56 molded thereon.

The addition of interconnections is accomplished externally in the conventional back panel connecting manner by simply connecting two external connection tubes similar to tubes 46 by means of an external conduit.

Thus, the present packaging system is a hybrid packaging concept which is a compromise between large scale integration and fully exposed back panel conduits. The advantages over large scale integration include better accessibility, relative ease of making engineering changes and the use of standard logic modules. The advantages over the fully exposed back panel conduits include a significant reduction in assembly time and the invulnerability of the integrated connections.

It is recognized that changes may be made in the construction arrangement of the parts of the packaging system without departing from the real spirit and purpose of the invention and it is our intention to cover by the following claims any modified forms of structure or use of mechanical equivalents which may reasonably be included within their scope.

What is claimed is:

1. A fluid logic circuit mechanism of the type having a plurality of circuit modules mounted on a common planar support member, said support member being a laminated assembly of layers comprising in sequence a base plate, a seal film, a back sealing plate, a circuit plate, and a front sealing plate, each of said plates having a plurality of aligned perforations therethrough sufficient in number to accommodate a plurality of different type circuit modules, said seal film being imperforate in the laminated assembly and of a material suitable for in situ perforating to provide perforations at selected external connection locations for a specific circuit module and said circuit plate having a plurality of interconnecting channels extending between selected perforations therein.

2. In a system as set forth in claim 1 comprising external connection means having a perforated sleeve adapted to be inserted in sealed relation in a perforation in said base plate and a conduit extending through said perforated sleeve in sealed relation thereto.

3. In a system as set forth in claim 1 further comprising blind terminal means adapted to be inserted into a perforation in said base plate to eliminate a previous external connection.

4. In a system as set forth in claim 1 further comprising an interconnection elimination means having a first seal means and a second seal means mounted in spaced apart relation on a rigid member, said first seal means adapted to be inserted in sealing relation in a perforation in said front sealing plate and said second seal means adapted to be disposed in sealing relation in a perforation in said base plate.

5. In a system as set forth in claim 1 wherein said seal film is comprised of a plastic film that can be perforated without residue by touching a heated element thereto.

6. In a system as set forth in claim 1 wherein said channel means are formed in opposed surfaces of said circuit plate.

* * * * *